United States Patent Office 3,377,304
Patented Apr. 9, 1968

3,377,304
HIGH OXIRANE FATTY ESTERS
Frank E. Kuester, La Grange, Ill., and Philip H. Rhodes, Cincinnati, Ohio, assignors to Swift & Company, Chicago, Ill., a corporation of Illinois
No Drawing. Continuation-in-part of application Ser. No. 807,985, Apr. 22, 1959. This application May 18, 1964, Ser. No. 368,389
6 Claims. (Cl. 260—23)

This application is a continuation-in-part of our co-pending application Ser. No. 807,985, filed Apr. 22, 1959, now abandoned.

This invention relates to polyvinyl resin compositions having improved properties and more particularly to polyvinyl resins plasticized with high oxirane epoxy fatty acid esters.

Polyvinyl resins, particularly polyvinyl halide resins, are employed in a wide range of applications and in many of these applications it is necessary to plasticize the resin. The physical properties of the resin depend to a great degree upon the amount and type of plasticizer incorporated therein. Usually, while the flexibility, tear resistance, and elongation of vinyls increase with increased plasticizer content, the tensile strength and hardness decrease. Many plasticizers have been employed in the formulation of vinyl resins, and while some of these plasticizers offer advantages in some respects, they possess shortcomings in other respects, and this results in the necessity for combinations of two or more plasticizers, each having certain desirable properties that are lacking in some others.

It is, therefore, an object of the present invention to provide a vinyl plasticizer composition which imparts to the resin more of the advantages desired in a plasticized resin while exhibiting less of the undesirable characteristics usually associated with prior art plasticizers.

It is a further object of this invention to provide novel plasticizer-stabilizer compositions which, when combined with vinyl resins, impart improved physical properties to the resin and which possess an unusually high degree of compatibility with the resin.

Another object of the invention is the provision of a plasticized vinyl halide resin composition having a high resistance to heat and light degradation.

Still another object is to provide flexible vinyl halide film of improved stability which is nontoxic and therefore adaptable for use in the packaging of foods.

Additional objects and advantages if not specifically set out will become apparent during the course of the disclosure which follows:

The plasticizer compositions of the present invention comprise esters of high oxirane containing higher fatty acids with mono, di, and polyhydric aliphatic alcohols. These esters are low viscosity oils possessing little or no color. The esters may be characterized as high oxirane fatty materials containing a plurality of oxirane rings or epoxy groups at those points in the fatty acyl radical which are normally occupied by double bonds in the original nonepoxidized fatty acid or ester.

Monohydric and dihydric alcohol esters of the high oxirane fatty esters which are contemplated include the aliphatic alkyl esters wherein the alcohol portion of the ester is a monohydric alcohol having 1–8 carbons, and aliphatic alcohol esters of dihydric alcohols having 2–6 carbon atoms. Lower aliphatic alcohols of the olefin and paraffin series and which may be substituted if desired with noninterfering substituents are suitable. The epoxy fatty acid component is made up of epoxy fatty acids of 10–30 carbons having an oxirane content above about 8.8. Suitable monohydric alcohols providing the alcohol moiety of the ester include methyl, ethyl, propyl, isopropyl, butyl, isobutyl, amyl, isoamyl, hexyl, heptyl, and octyl alcohols. Benzenoid alcohols which may be employed in preparing the ester are those benzoid alcohols having less than 10 carbons and include benzyl, phenyl, 2-phenylethyl, 1-phenylethyl and nuclear methylated phenyl alcohols. Dihydric alcohols include the lower glycols, such as ethylene glycol, 1,2 propane diol, 1,3 propane diol, dimethyl ethylene glycol, trimethylene glycol, tetramethylene glycol, and up to hexamethylene glycol. Generally the lower monohydric alcohol esters provide a less viscous dispersion of the vinyl when the resin and plasticizer are mixed than the higher monohydric alcohol esters. The lower alcohol esters are also more volatile than the higher alcohol esters, and therefore for a given preparation a balance between viscosity requirements and volatility requirements is possible by careful selection of the ester. The dihydric and polyhydric alcohol esters act similarly.

Methods for determining the oxirane content of a given high-oxirane ester or mixture of esters are well-known and, while the preferred technique is American Oil chemists Society tentative method Cd-9-57, described in Official and Tentative Methods of the American Oil Chemists Society, Second Edition, 1946, including Additions and Revisions 1947 to 1958, inclusive, other analytical methods known in the art may be employed. The method described by A. J. Durbetaki, Analytical Chemistry, volume 28, No. 12, December 1956, pp. 2000–2001, is also suitable for determining oxirane content.

The polyhydric alcohol esters of the high oxirane fatty acids include the tri-, tetra-, penta-, and hexahydric alcohol esters of the fatty acid moiety. Included within this group are those aliphatic alcohols having 3–6 carbons and 3 or more alcohol groups. These alcohols include glycerol, erythritol, pentaerythritol, and hexitols such as mannitol and sorbitol.

The epoxy fatty acid portion of the novel plasticizer is made up of those fatty acids and mixtures of fatty acids having 10–30 carbons and an oxirane content above about 8.8. The saturated acid content of the fatty acid mixture should preferably not exceed about 10–15%. Therefore the presence of such saturated acids as stearic acid, palmitic acid, myristic acid, etc., should for best results be held to a minimum. Moreover, the fatty acids should not be hydroxylated or contain conjugated unsaturation. Mixtures containing epoxystearic, diepoxystearic, triepoxystearic, diepoxyeicosanoic, triepoxyeicosanoic, diepoxydocosanoic, triepoxydocosanoic, tetraepoxydocosanoic and pentaepoxytetracosanoic acids are a very desirable source of the oxirane supplying radical.

Suitable naturally occurring oils which, when substantially completely epoxidized, may be used in practicing the invention are those vegetable and marine triglycerides containing not more than about 10–15% saturated fatty acids and containing unsaturated fatty acids predominantly. These naturally occurring oils should have a degree of unsaturation represented by an iodine value of about 170 to about 205 and the fatty acids are neither hydroxylated nor possess conjugated unsaturation. The linolenic acid oils which are primarily triglycerides of linoleic, and linolenic acids are preferred. Among those oils which may be employed are highly epoxidized perilla oil and highly epoxidized linseed oil. These naturally occurring highly unsaturated oils also provide a valuable source of fatty acid mixtures. Purified and concentrated fatty acid mixtures containing a large amount of unsaturated fatty acids may be obtained from such vegetable oils as soybean oil and tall oil or from the fish oils. These materials must first be refined to concentrate the more highly unsaturated components and remove at least a portion of the saturated acids. The fish oils in particular have a high degree of unsaturation as represented by iodine values as high as 270 but contain too great a quantity of saturated acids.

Therefore these materials are first treated to reduce the saturated acid content below about 10–15%.

In order for the epoxy fatty acid ester to be effective in providing in the esters the desired compatibility, it is necessary that the fatty acid or mixture of fatty acids forming the fatty acyl portion of the ester have an oxirane content above about 8.8 and, as a practical matter, in the range 8.8–12.3. The preferred oxirane content of the fatty acyl component is around 9.0–9.5. This preferred oxirane content is easily obtained from a mixture of epoxy containing fatty acids containing less than about 15% saturated fatty acids and consisting predominantly of the di-, tri-, and tetra-ethanoic acids. A particularly desirable fatty acid mixture is one containing less than about 35% epoxy linoleic acid and the total epoxy linoleic-epoxy linolenic acid content being above about 60%. This preferred mixture is readily obtained from naturaly occurring linseed oil or perilla oil by subjecting such oils, provided they possess an iodine value above about 170, to an epoxidation treatment such as is described hereinafter.

Substantially completely epoxidized triglycerides having an oxirane-oxygen content of about 8.8–9.2% and an iodine value of 0–12 provide, in combination with nonreactive polyvinyl chloride resins, a most unique product. Substantially completely epoxidized linseed oil is particularly preferred since this composition can be prepared from readily available naturally-occurring triglyceride oil to possess a high oxirane value, low residual unsaturation and low byproducts such as polymeric materials and hydroxylated substituents. Epoxized linseed oil having the specified oxirane-oxygen value and iodine value and low hydroxyl substitution represented by an infrared absorptivity at 2.9 microns of 0.020 maximum (.007–.020) is most effective. Absorptivity at 2.9 microns is run in 20% carbon disulfide solution with a Perkin-Elmer Model 21 Spectrophotometer using a base line drawn from minima at either side of the peak at 2.9 microns.

This composition has a high chemical purity and its low viscosity (Gardner-Holdt) of V-maximum of 8.8 poises maximum is evidence of low polymer content. The composition has an acid number of 0.3 maximum, and is light in color, having a Gardner color of less than 1, and thus does not introduce any significant amount of color into clear plastics in which it is formulated.

Although the aforementioned compositions exert their greatest effect and provide the greatest benefit with vinyl type resins, other thermoplastic and thermosetting resins, such as the cellulose esters and natural and synthetic rubber, may advantageously be compounded with the plasticizers of this invention. Accordingly, the invention is primarily applicable to polyvinyl resins in general and particularly to polyvinyl chloride, polyvinyl acetate, vinyl chloride-vinyl acetate copolymers, and vinyl chloride-vinylidene chloride copolymers. Those thermoplastic vinyl halide copolymers containing greater than 50% of the monomer units as vinyl halide units are preferred. The Vinylite resins, such as Vinylite VAGH, Vinylite VYHH, Vinylite VMCH, and the Geon resins, such as Geon 103 and Geon 121, are specific examples of suitable vinyl halide polymers. Vinylite VAGH is reported to contain 91% vinyl chloride units, 3% vinyl acetate units, and 6% vinyl alcohol. Vinylite VYHH contains 87% vinyl chloride and 13% vinyl acetate. Vinylite VMCH contains about 86% vinyl chloride, 13% vinyl acetate, and 1% maleic acid. Geon 121 and Geon 103 contain in excess of 90% vinyl chloride units and generally 96–100% vinyl chloride units.

Vinyl halide resins with which the compositions of the invention are most effective are those polyvinyl chloride and polyvinylidene chloride homopolymers and copolymers which are plasticized or flexibilized with the high oxirane esters but do not react with the esters. Thus those polymers and copolymers of vinyl and vinylidene halide which are free of poly unsaturated ethers and esters are contemplated. The resins of the invention are free of multiethylenically unsaturated monomers such as diallyl succinate, diallyl maleate, divinyl ether and such monomers which could react with the epoxidized ester and promote objectionable stiffening and loss of flexibility of the plasticized vinyl polymer.

While the high oxirane content of the epoxy containing material appears to provide a most important advantage in the processing benefits and physical characteristics of products made from the mixture of epoxide and vinyl, the high oxirane content of the epoxy composition combined with a vinyl stabilizer appears to impart extremely high stability to the resin composition. For example, in the production of polyvinyl chloride films from a polyvinyl chloride composition containing a high oxirane fatty ester and a stabilizer comprising an alkaline earth metal salt of a higher aliphatic organic acid, it is possible to operate an extruder for a long period of time without shutdown and with a minimum amount of burning and charring of the resin composition in the extruder. With conventional vinyls and vinyls plasticized with well-known plasticizers such as dioctyl phthalate and epoxy plasticizers of less than the minimum oxirane content, it is necessary to frequently shut down extruders being employed to form the vinyl because of an accumulation of charred resin in the extruder resulting from heat degradation. Specific stabilizers which may advantageously be employed include zinc octoate, barium octoate, calcium octoate, and mixtures of barium-cadmium salts of fatty acids as barium-cadmium laurate or barium-cadmium stearate. Still other stabilizers are the typical vinyl stabilizers such as dibutyl tin dilaurate, zinc dilaurate, the lead carbonates and stearates, barium-cadmium phosphites, etc. A particularly valuable stabilizer mixture employed in the compositions of the present invention is a mixture of zinc and calcium stearates. This composition is unusually valuable because it appears to inhibit heat degradation while imparting improved lubricating qualities to the polyvinyl chloride resin. Moreover, it is sufficiently non-toxic that the film can be used in wrapping foods.

Fillers, pigments, lubricants, antistatic agents, and antiblocking agents may also be employed in the composition where desirable. A particularly effective static reducer is the product resulting from the condensation of 1 mol of tetraethylene pentamine with 5 mols of stearic acid.

The following examples which are intended to be illustrative only and should in no way be considered limitative are included herein to facilitate an understanding of the invention.

EPOXIDATION OF UNSATURATED FATTY ACID OR MIXTURES THEREOF

Inasmuch as heavy metals deleteriously affect the epoxidation reaction, it is advisable to conduct the epoxidation in glass equipment or in carefully prepared metal reaction vessels. The metal equipment should be conditioned by nitric acid passivation before the first use to remove welding beads, metal filings, and other sources of heavy metal contamination. Also the reactants should be free of heavy metals. The procedures which are described hereafter were conducted in 316 stainless steel equipment.

Example I

A benzene solution comprising 780 lbs. benzene and 850 lbs. linseed oil is charged to the reaction vessel and the solution is vigorously agitated as 525 lbs. of 50% hydrogen peroxide is added. The sulfuric acid catalyst (5.3 lbs.) is diluted with 5 lbs. of peroxide, and this mixture is then added to the reaction vessel. The well-agitated mixture is then heated to 145° F. and 90% formic acid is slowly added to the heated mixture. The reaction is exothermic and the temperature is permitted to rise to about 160–162° F., at which time cooling is employed to maintain this approximate temperature. The addition of 45 lbs. of formic acid requires about 2 hours. The total reaction time including this 2-hour addition period is about 9 hours, and the reaction temperature ranges between 160–168° F. After cooling, the aqueous layer of the product is drawn off and the remaining benzene layer is washed several times with hot water until the wash solution is neutral. Usually about 6 or 7 washes are required. A purification step may be interposed at this point. The purification involves agitating a mixture of the washed benzene layer and 80 lbs. water containing 8 lbs. sodium hydroxide or other alkaline refining agent for 1 hour while maintaining the temperature at about 150° F. Benzene is then removed by distillation at atmospheric pressure, the final traces being removed under vacuum. Physical constants of the starting linseed oil and the epoxidised product are as follows:

|  | Feed Analysis | Epoxidized Product |
|---|---|---|
| Iodine Value | 182.0 | 4.57 |
| Sap. No. | 193.0 | 175.5 |
| F.F.A. | 0.39 | 0.09 |
| Gardner Color | 4 | 4 |
| Gardner Viscosity | A | T-U |
| Peroxide No. | 1.05 | 26.4 |
| Percent Oxirane | 0.0 | 9.1 |
| Moisture and Vapor | 0.03 | 0.19 |

Example II

The preparation of the lower alkyl esters is as follows: Linseed oil is reacted with the appropriate lower monohydric alcohol by refluxing the alcohol containing potassium hydroxide with the oil. The glycerol which is freed in the ester interchange is drawn off, and more alcoholic caustic is added to the reaction mixture and refluxing continued. After 3 passes of alcoholic alkali the free glycerol content of the product is less than 0.3%. The first pass with the primary alcohol involves about 30% by weight of the alcohol based upon the linseed oil while the 2 subsequent passes involve the use of about 50% by weight of the alcohol. Epoxidation of the monohydric alcohol esters of the linseed oil fatty acids is carried out in the manner of Example I. The methyl, ethyl, propyl, n-butyl, isobutyl, and n-octyl and benzyl esters of epoxidized linseed oil fatty acids were prepared. The physical constants of these esters is as follows:

| Ester of Linseed Oil Fatty Acids | Initial IV | Final IV | Percent Total Glycerol | Percent Oxirane | Percent Oxirane Oxygen in Fatty Acid Portion |
|---|---|---|---|---|---|
| 1 — Methyl | 185 | 7.2 | 0.04 | 8.9 | 9.3 |
| 2 — Ethyl | 180 | 8.0 | 0.03 | 8.5 | 9.3 |
| 3 — Propyl | 161 | 7.1 | 0.20 | 7.9 | 9.0 |
| 4 — n-Butyl | 154.5 | 7.4 | 0.07 | 7.6 | 9.0 |
| 5 — Isobutyl | 156.5 | 8.5 | 0.04 | 7.5 | 8.9 |
| 6 — n-Octyl | 130 | 12.0 | 0.10 | 6.44 | 8.8 |
| 7 — Benzyl * | 145 | 7.3 |  | 7.1 | 9.1 |

*The benzyl ester was prepared from the achid chloride of the linseed acid mixture and benzyl alcohol in pyridine. It was epoxidized in the manner of Example I.

The upgrading or concentration of more unsaturated fatty acids and the removal of the more saturated fatty acid components from naturally occurring fatty acid esters and fatty alcohols and mixtures thereof follows:

Example III

Linseed oil fatty acids are prepared by saponifying linseed oil with alcoholic alkali; in the present case a methanol solution of sodium hydroxide was employed. Upon neutralization and removal of the fatty acid component, a mixture containing 47% linolenic, 17% linoleic, 27% oleic, and 9% saturated fatty acids was obtained. 1,000 grams of this mixed fatty acid composition was added to a hot solution of 2,000 grams of urea in 5 liters of methanol. The methanol solution of urea was agitated vigorously during addition of the fatty acids. A precipitate formed and the mixture was allowed to stand overnight at room temperature. The precipitated urea complexes were then filtered off and discarded, while the filtrate was distilled under vacuum to remove the major portion of methanol. The fatty acid mixture derived from the filtrate was then washed with water to remove excess urea. After drying, the product which consisted of 425 grams of an oily liquid was analyzed. It was found to have an iodine value of 241 as compared to an iodine value of the mixture of fatty acids prior to the urea treatment of 181.4.

This urea fractionation technique was also employed in the treatment of soybean oil fatty acids and tall oil fatty acids. The composition of the fatty acid mixtures follows:

| Analytical Data | Soybean Oil | | Distilled Tall Oil | |
|---|---|---|---|---|
|  | Original Oil | After Urea Treatment | Original Oil | After Urea Treatment |
| Iodine Value of Fatty Acid Mixture | 123.0 | 190.7 | 124.2 | 169.4 |
| Percent Linolenic Acid | 6.8 | 19.0 |  |  |
| Percent Linoleic Acid | 40.7 | 76.4 | 47.0 | 90.2 |
| Percent Oleic Acid | 39.9 | 3.5 | 45.0 | 9.0 |
| Percent Saturated Acid | 11.9 | 1.1 | 7.0 | 0.8 |

The yield of highly unsaturated soybean oil fatty acids was 35%, while the yield of highly unsaturated tall oil fatty acids was 51%. Other methods of concentrating unsaturated fatty acids are known in the art.

Each of the fractionated fatty acid mixtures noted above was esterified with n-butanol in the following manner: A mixture of 500 grams of the fatty acids and 250 grams of n-butanol was heated, along with 10 grams of p-toluene sulfonic acid, in a glass vessel fitted with a reflux condenser and a water trap for a time sufficient to remove the theoretical amount of water. A water trap reflux condenser equipped with a calibrated receiver is suitable for this purpose. After the theoretical amount of water had been accumulated in the trap, the reaction mixture was cooled, washed with a 5% aqueous solution of sodium carbonate, and finally washed with water until the washings were neutral to litmus. The excess alcohol was steam distilled from the ester and after drying the product was analyzed.

| Butyl Ester of | Saponification No. | Iodine Value | Acid Value |
|---|---|---|---|
| Linseed Oil Fatty Acids | 164.9 | 205.0 | 0.93 |
| Soybean Oil Fatty Acids | 167.4 | 160.1 | 0.39 |
| Tall Oil Fatty Acids | 165.9 | 143.9 | 0.65 |

After epoxidation of these butyl esters in accordance with the procedure described in Example I, the final epoxidized esters had the following physical characteristics:

| Butyl Ester of | Saponification No. | Acid No. | Iodine Value | Percent Oxirane Oxygen |
|---|---|---|---|---|
| Linseed Oil Fatty Acids | 148.7 | 1.10 | 7.6 | 9.89 |
| Soybean Oil Fatty Acids | 151.0 | 0.41 | 4.9 | 7.93 |
| Tall Oil Fatty Acids | 152.0 | 0.63 | 3.2 | 7.47 |

It will be noted that, while the percent oxirane oxygen for the butyl esters is less than 8.8, the percent oxirane oxygen in the fatty acid is well above this lower limit. These compositions are most effective, particularly as regards handling characteristics and the provision of superior low temperature flexibility characteristics in films prepared from vinyl halide resins containing these lower alkyl esters of mixed epoxidized fatty acid esters.

Flexible films which are prepared from the vinyl resin-high oxirane composition exhibit substantial freedom from plasticizer migration and exudation and also possess highly desirable handling characteristics. These films are prepared by well-known milling, calendering, or extruding techniques. It is possible, because of the unexpectedly high compatability of the expoxide and resin, to employ the high oxirane fatty ester as the sole plasticizer for the vinyl to obtain the desired flexibility. Moreover, troublesome heat degradation of the vinyl halide is held to a minimum by the plasticizer. This improved resistance to heat-induced deterioration allows for the omission of stabilizer compositions, such as the metal salts mentioned previously. This ability to dispense with metal salt stabilizers is most important in the preparation of food films, since films designed for use in the packaging of foods should be free of extractable toxic metal salts and other toxic substances.

The effect of varying amounts of the plasticizer on milled films prepared from the vinyl halide-high oxirane mixture is shown in Example IV which follows:

Example IV

A calendering type polyvinyl chloride resin (Geon 103 EP, a product of B. F. Goodrich Co., Cleveland 15, Ohio) containing more than 90% vinyl chloride units in the monomer mixture was admixed with varying proportions of epoxidized linseed oil (oxirane content 9.2%) in a Hobart mixer to form dry blends. The high oxirane composition was varied in increments of 5 parts. One part of zinc stearate was added to each batch having less than 60 parts of the high oxirane compound. The formulation is as follows:

| | Parts |
|---|---|
| Polyvinyl chloride (Geon 103 EP) | 100 |
| Epoxidized linseed oil | X |
| Zinc stearate | 1 |

Each of the dry blends was milled at 320° F. for 5 minutes and films of 2–4 mils thickness were taken for determination of the physical data for each. The following table shows the physical data for films prepared from mixes containing varying amounts of the epoxide:

| Parts Epoxidized Linseed Oil in above Formulation | Ultimate Tensile Strength, p.s.i. | Corrected Elongation at Break, percent | Modulus at 100% Elongation, p.s.i. | Weatherometer Stability (hrs.)* |
|---|---|---|---|---|
| 25 | 4,700 | 10 | | 613 |
| 30 | 3,850 | 65 | | 629 |
| 35 | 3,200 | 180 | 3,150 | 654 |
| 40 | 3,200 | 205 | 2,950 | 660 |
| 45 | 2,900 | 195 | 2,600 | 665 |
| 50 | 3,000 | 200 | 2,600 | 723 |
| 55 | 2,800 | 210 | 2,300 | 735 |
| 60 | 2,500 | 215 | 1,900 | 792 |
| 65 | 2,300 | 215 | 1,650 | 827 |
| 70 | 2,000 | 225 | 1,450 | 757 |
| 75 | 1,800 | 250 | 1,400 | 810 |

* An Atlas Sunshine-Carbon Arc type weatherometer Model XW was employed.

Example V

Extruded films were prepared from formulations containing varying levels of the high oxirane linseed oil. The dry blend of the resin plasticizer compound was pelletized and the pellets were fed to an extruder which produced the film in the form of an inflated tube. The formula for the dry blend is as follows:

| | Parts |
|---|---|
| Polyvinyl chloride (Geon 103 EP) | 100 |
| Epoxidized linseed oil | X |
| Calcium-zinc stearate (Harshaw 59–V–11) | 2 |
| Mineral oil | 0.9 |

The films prepared showed the following physicals:

| Parts Expoxidized Linseed Oil in Above Formulation | Ultimate Tensile Strength, p.s.i. | Corrected Elongation at Break, percent | Modulus at 100% Elongation, p.s.i. | Tearing Force, g./mil |
|---|---|---|---|---|
| 20 L | 7,300 | 5 | | 21 |
| T | 7,200 | 5 | | 11 |
| 30 L | 5,700 | 130 | 5,300 | 80 |
| T | 5,300 | 150 | 4,800 | 96 |
| 40 L | 4,000 | 210 | 3,700 | 136 |
| T | 4,100 | 210 | 3,700 | 114 |

L—represents the physicals measured in the longitudinal direction of the film. T—represents the physicals measured in the transverse direction of the film.

Example VI

Milled films were prepared from the following compositions which were formulated as dry blends in the mixer:

| | Parts |
|---|---|
| Polyvinyl chloride (Geon 103 EP) | 100 |
| Butyl ester epoxidized linseed oil fatty acids | X |
| Barium-cadmium laurate stabilizer | 2 |
| Chelating compound | 1 |

Mixture was milled for 5 minutes at 340° F.

| Parts Butyl Ester Epoxidized Linseed Oil Fatty Oil | Longitudinal | | Transverse | |
|---|---|---|---|---|
| | Ultimate Tensile Strength, p.s.i. | Corrected Elongation at Break, percent | Ultimate Tensile Strength, p.s.i. | Corrected Elongation at Break, percent |
| 0 | 7,500 | 9 | 8,400 | 10 |
| 4 | 7,900 | 4 | 7,900 | 3 |
| 8 | 7,100 | 3 | 7,000 | 3 |
| 12 | 6,500 | 5 | 6,200 | 3 |
| 16 | 5,100 | 10 | 4,800 | 7 |

It was noted that the sample containing 4 parts butyl ester can be processed much more easily than the same containing no plasticizer. While elongation and tensile strength are not greatly affected by the plasticizer, the heat stability of the mix is improved significantly.

Example VII

The following ingredients were dry blended in a Hobart mixer:

| | Parts |
|---|---|
| Polyvinyl chloride | 100 |
| Epoxidized linseed oil (9.2% oxirane oxygen) | 40 |
| Zinc octoate | 1 |
| Static reducer [1] | 2 |
| Mineral oil | ¾ |

[1] One mol of tetraethylene pentamine mixed with 5 mols of stearic acid and heated to a temperature of 180° C. for about 2 hours.

The formulation is extruded to provide thin films of about 1–10 mils thickness. The film is clear, transparent, and glossy and has very good flexibility as well as freedom from static. The polyvinyl chloride composition exhibits very desirable handling characteristics, and there is a minimum of burning and charring in the extruder. This resistance to heat degradation results primarily from the superior stability of the formulation.

Obviously, many modifications and variations of the invention as hereinbefore set forth may be made without departing from the spirit and scope thereof, and therefore only such limitations should be imposed as are indicated in the appended claims.

We claim:
1. A polyvinyl resin composition comprising: a vinyl halide polymer which is free of polyunsaturated monomers and which contains at least 50% polymerized vinyl halide units and glyceride esters of oxirane-containing fatty acids of 10–30 carbons having a low amount of hydroxyl substitution and a low polymer content, the oxirane groups being present in the fatty acyl portion of said esters, the oxirane content of said esters being in the range 8.8–9.2% and the iodine value less than about 12.

2. A polyvinyl resin composition comprising a vinyl halide polymer which is free of polyunsaturated monomers and which contains at least 50% vinyl halide units and lower alkyl alcohol esters of epoxidized linseed oil fatty acids having a low amount of hydroxyl substitution and a low polymer content, the oxirane content of said fatty acids being about 8.8–9.2% and the iodine value less than about 12.

3. A polyvinyl resin composition comprising a homopolymer of polyvinyl chloride and glyceryl esters of epoxidized linseed oil fatty acids, the oxirane content of said fatty acids being about 8.8–9.2% and having a low amount of hydroxyl substitution as measured by an infrared absorptivity at 2.9 microns of .02 maximum, a low polymer content as measured by a viscosity not substantially in excess of 8.8 poises and the iodine value less than about 12.

4. A polyvinyl resin composition comprising a vinyl halide resin containing at least 90% vinyl chloride units and a plasticizer, said plasticizer having a low amount of hydroxy substitution and a low polymer content and being a mixture lower alkyl alcohol esters of epoxidized fatty acids wherein said mixture comprises esters of epoxidized linoleic acid and epoxidized linolenic acid, the epoxidized linoleic acid comprising less than about 35% based on said fatty acid mixture, and the combined epoxidized linoleic-linolenic acid content of said mixture comprising more than about 60% based on said fatty acid mixture, the oxirane content of said epoxidized fatty acid mixture being about 8.8–9.2% and the iodine value less than about 12.

5. Epoxidized triglyceride esters of 10–30 carbon fatty acids, said triglyceride having an oxirane oxygen content of about 8.8–9.2%, a low amount of hydroxyl substitution as measured by an infrared absorptivity at 2.9 microns of .02 maximum, a low polymer content as measured by a viscosity not substantially in excess of 8.8 poises and an iodine value less than 12.

6. Substantially completely epoxidized linseed oil having an iodine value of 12 maximum, an oxirane oxygen content of about 8.8–9.2%, an infrared absorptivity at 2.9 microns of 0.02 maximum, and a viscosity of 8.8 poises maximum.

References Cited

UNITED STATES PATENTS

| | | | |
|---|---|---|---|
| 3,047,415 | 7/1962 | Rhodes et al. | 260—23X |
| 3,196,117 | 7/1965 | Boller | 260—23 |
| 3,230,189 | 1/1966 | Johnson et al. | 260—23 X |
| 2,556,145 | 6/1951 | Niederhauser | 260—18 |
| 2,964,484 | 12/1960 | Findley et al. | 260—23 X |
| 2,993,920 | 7/1961 | Budde et al. | 260—18 |
| 3,008,911 | 11/1961 | Douglas | 260—23 X |
| 3,070,608 | 12/1962 | Kuester et al. | 260—23 X |
| 3,119,711 | 1/1964 | Starmann et al. | 260—18 |

OTHER REFERENCES

Becco Bulletin, Epoxidation and Hydroxylation with Hydrogen Peroxide and Peracetic Acid, pp. i, ii, 1–3, 34–36, 39, 46, 47 Becco Bulletin 69, October 1955.

Industrial Oil and Fat Products, Interscience Publishers Inc., New York, Second Edition, 1951 (Treatise by Alton E. Bailey).

DONALD E. CZAJA, *Primary Examiner.*

LEON J. BERCOVITZ, JAMES A. SEIDLECK,
*Examiners.*

R. W. GRIFFIN, *Assistant Examiner.*